Dec. 2, 1969
C. R. STURTZ, JR
3,481,498
APPARATUS FOR REEVING CONDUITS IN A TRIPLE
SECTION EXTENDIBLE MAST
Filed June 12, 1967
11 Sheets-Sheet 1
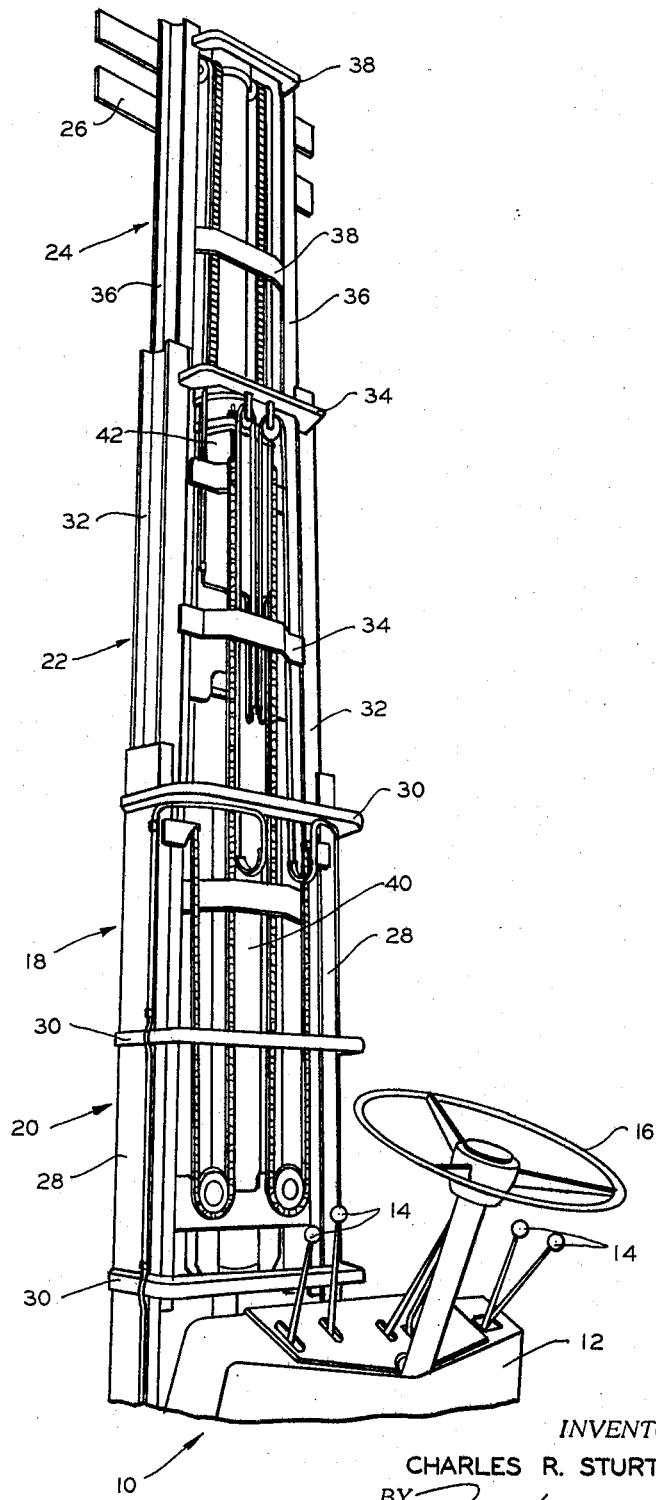
FIG. I
INVENTOR
CHARLES R. STURTZ JR.
BY
ATTORNEY

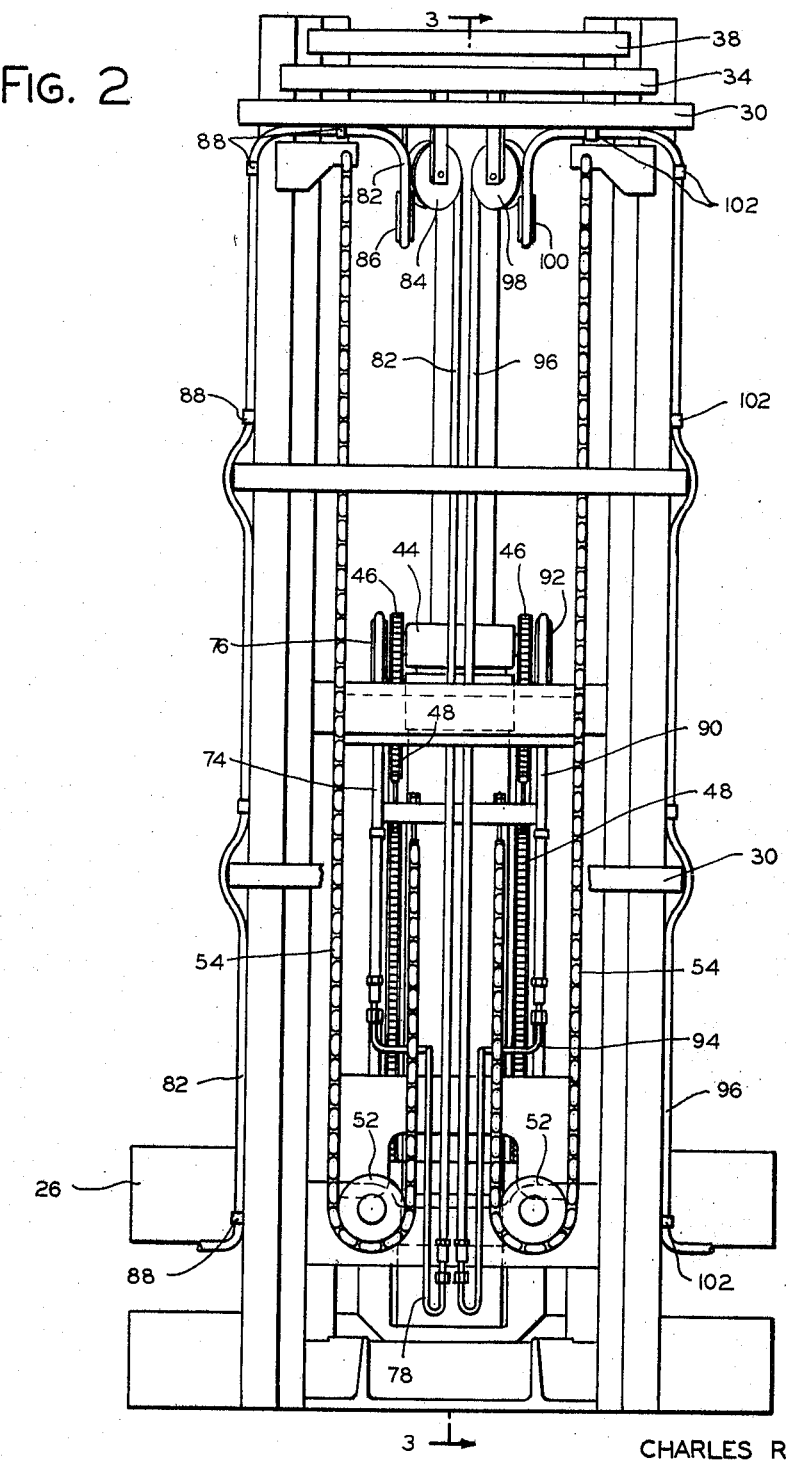

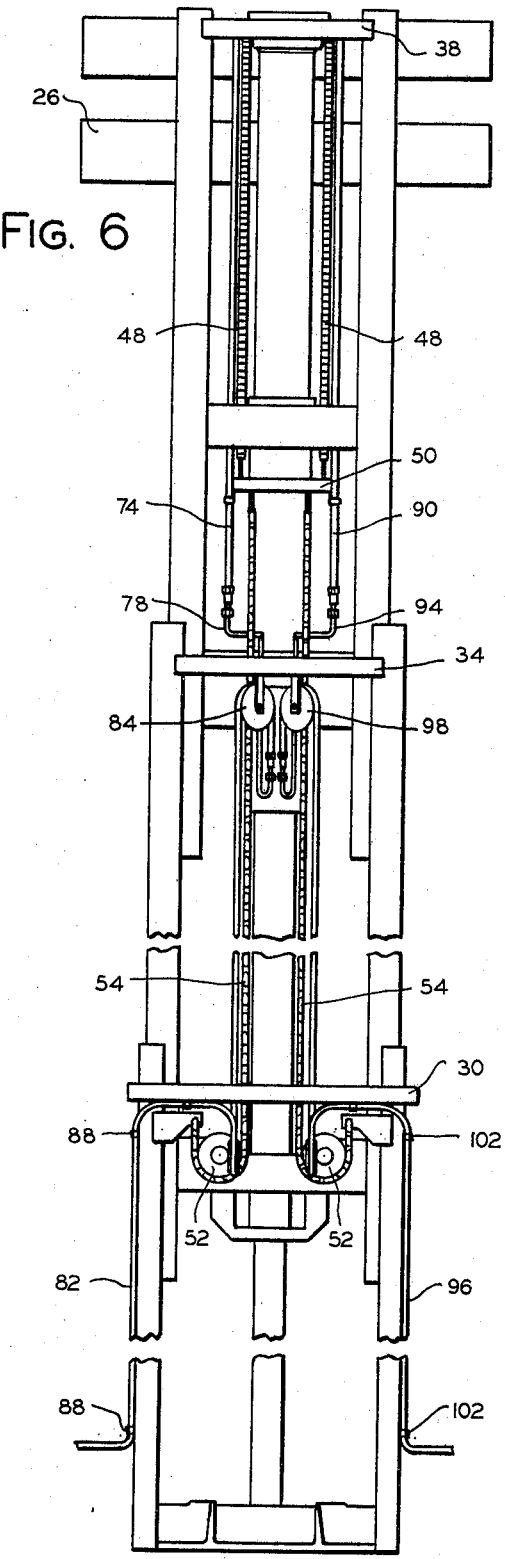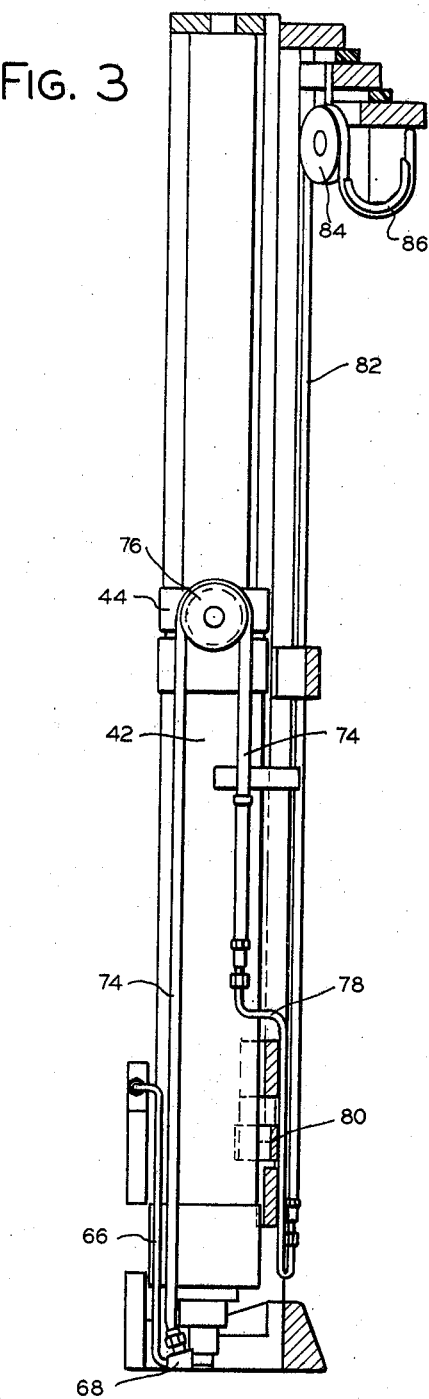

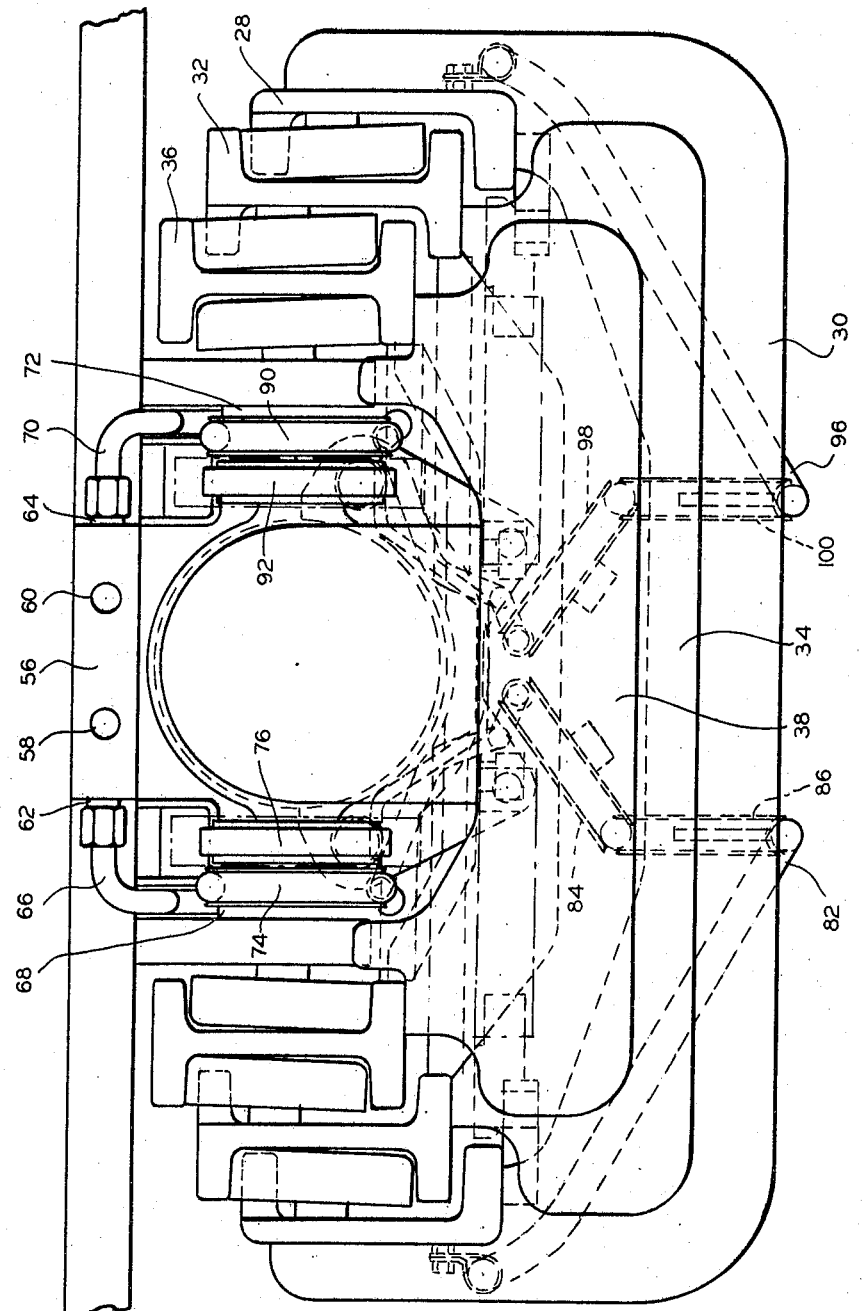

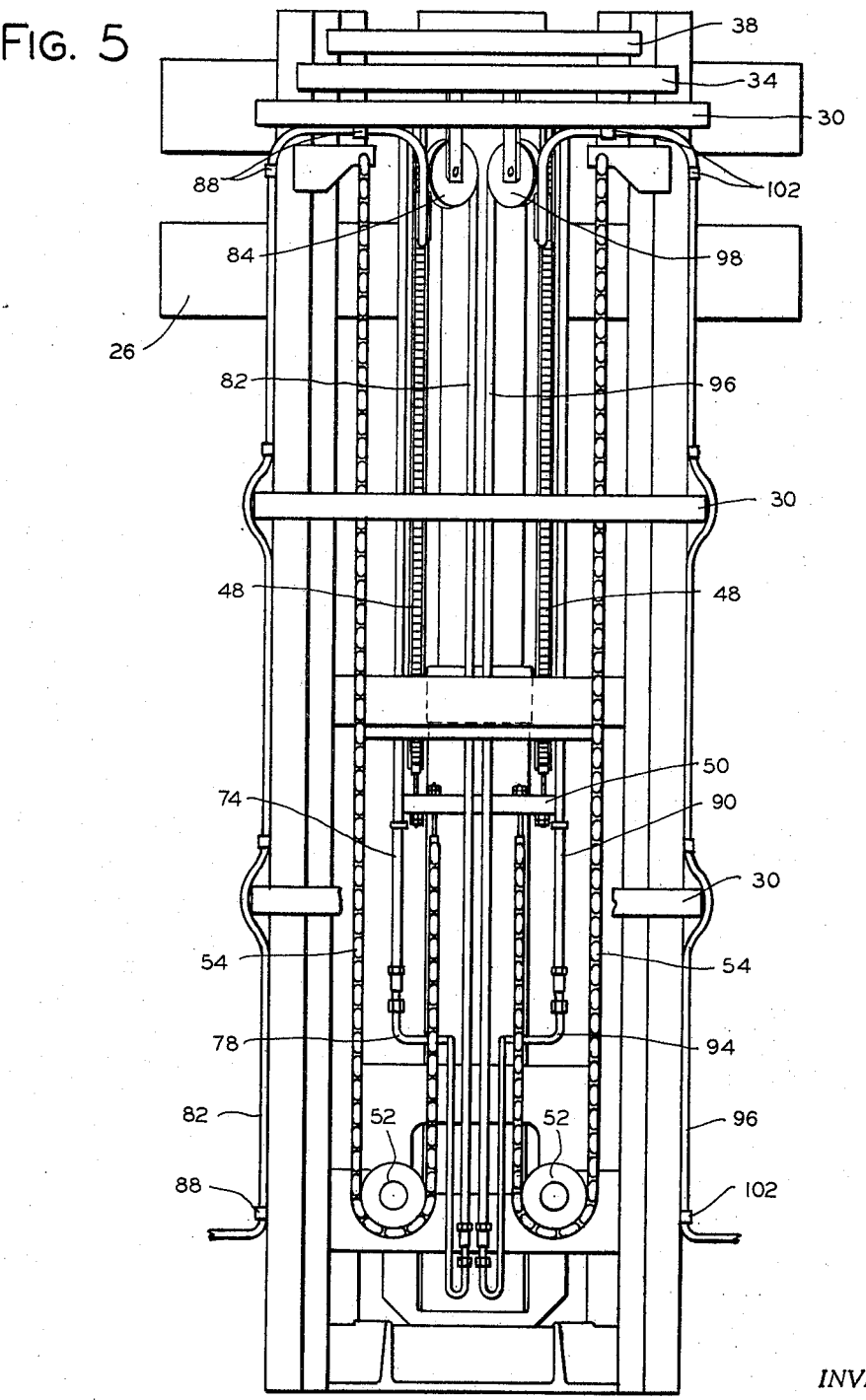

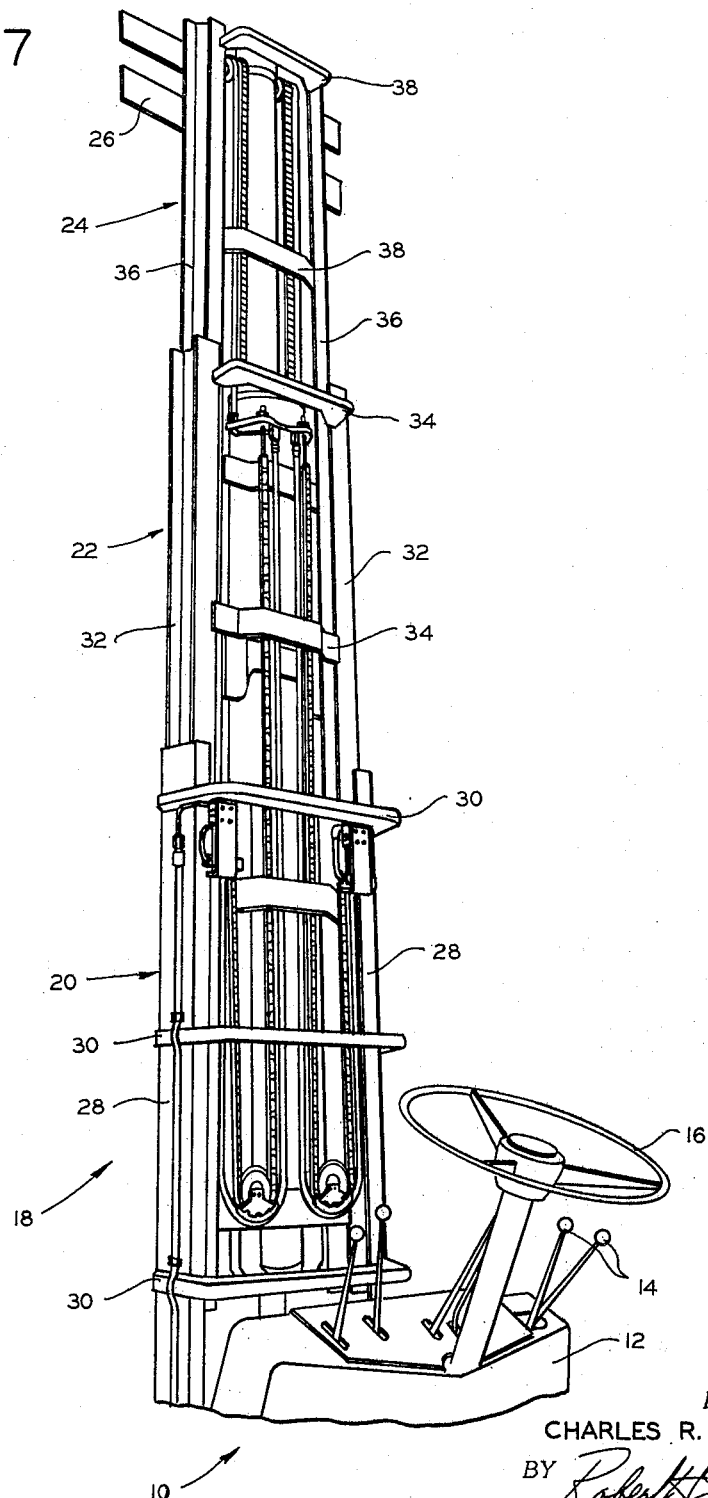

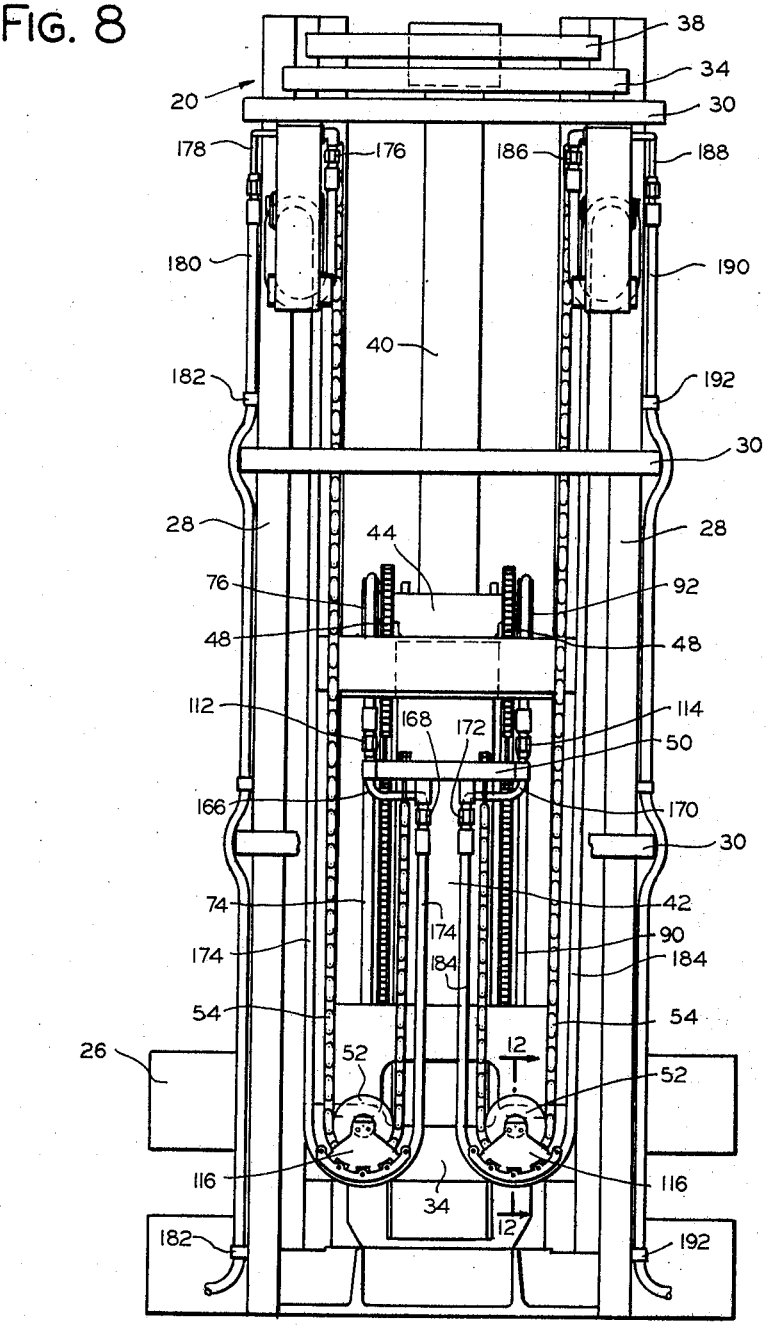

Dec. 2, 1969 C. R. STURTZ, JR 3,481,498
APPARATUS FOR REEVING CONDUITS IN A TRIPLE
SECTION EXTENDIBLE MAST
Filed June 12, 1967 11 Sheets-Sheet 8

INVENTOR
CHARLES R. STURTZ JR.
BY Robert H Johnson
ATTORNEY

Dec. 2, 1969
C. R. STURTZ, JR  3,481,498
APPARATUS FOR REEVING CONDUITS IN A TRIPLE
SECTION EXTENDIBLE MAST
Filed June 12, 1967
11 Sheets-Sheet 9
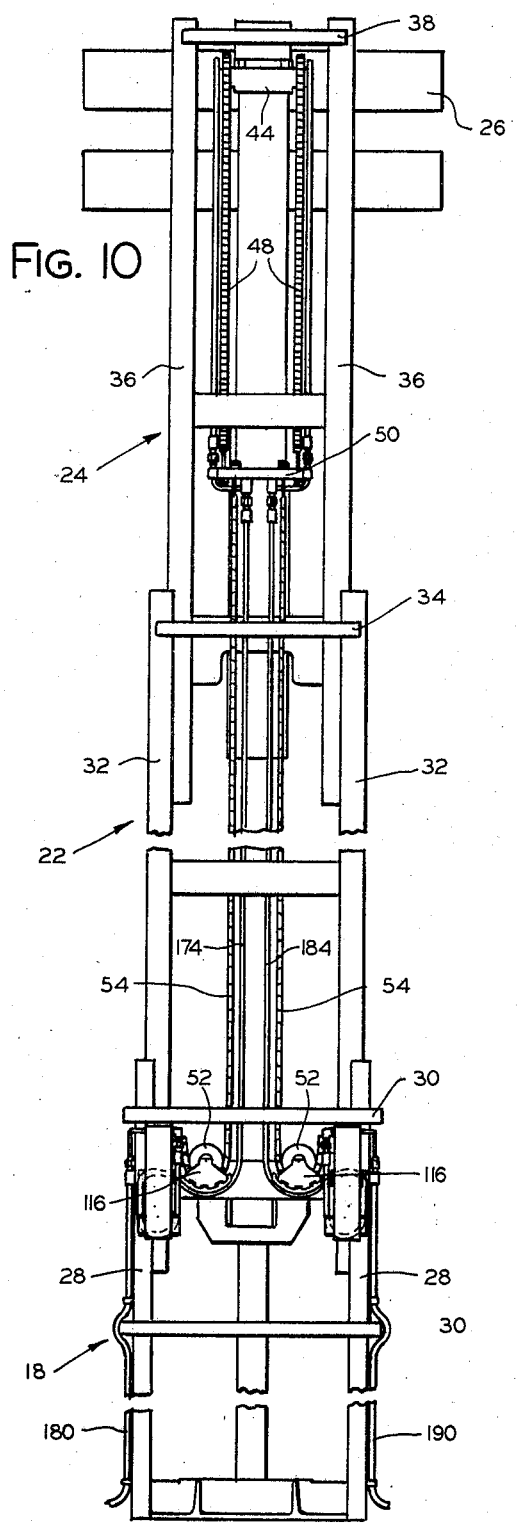
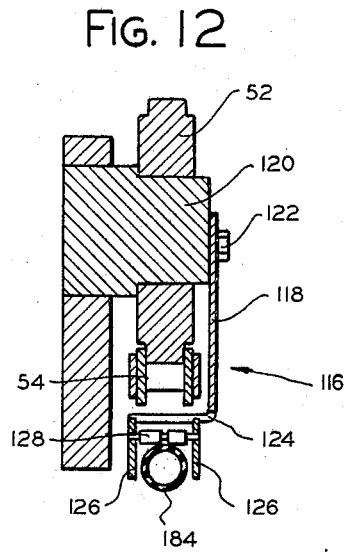
INVENTOR
CHARLES R. STURTZ JR.
BY Robert H. Johnson
ATTORNEY

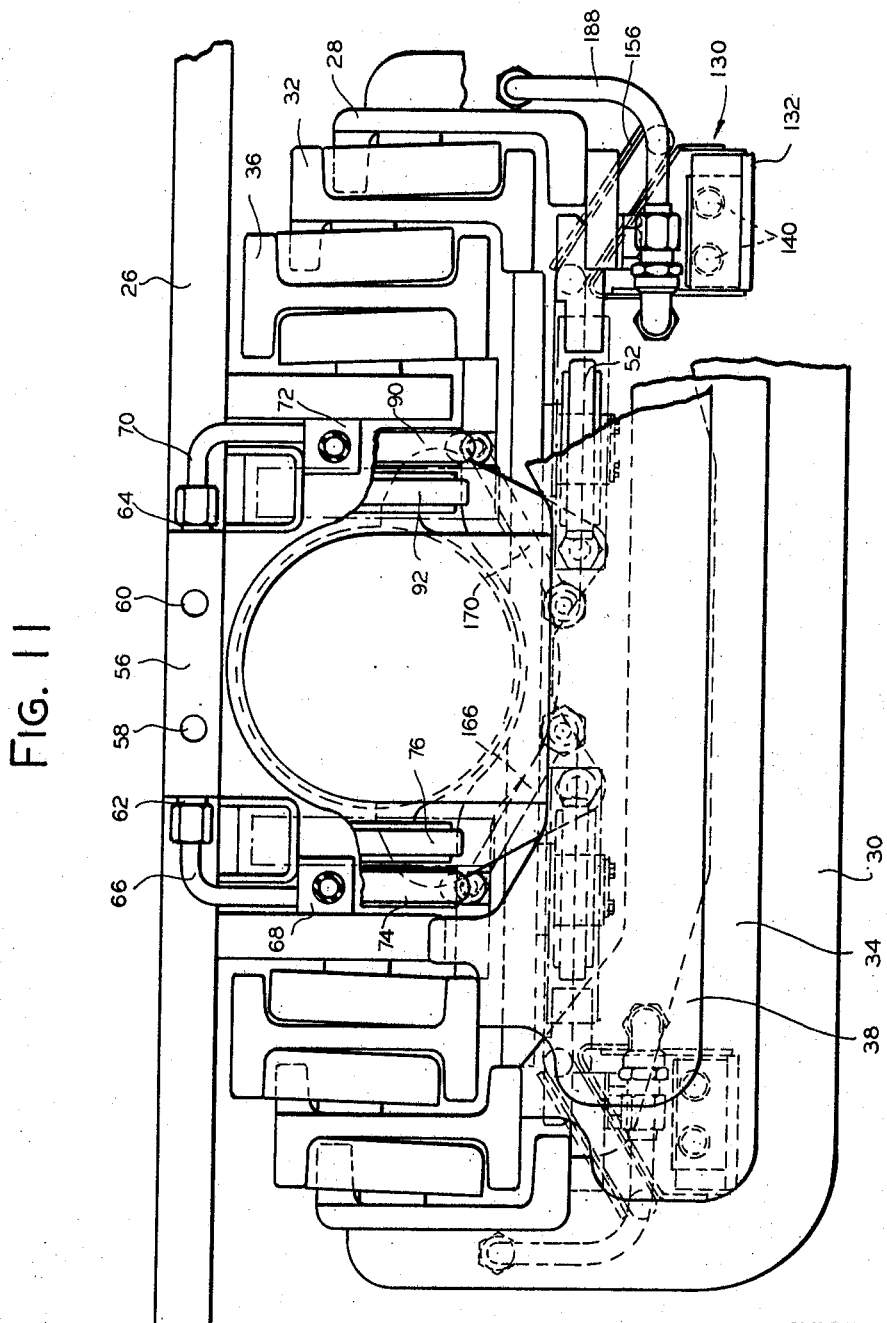

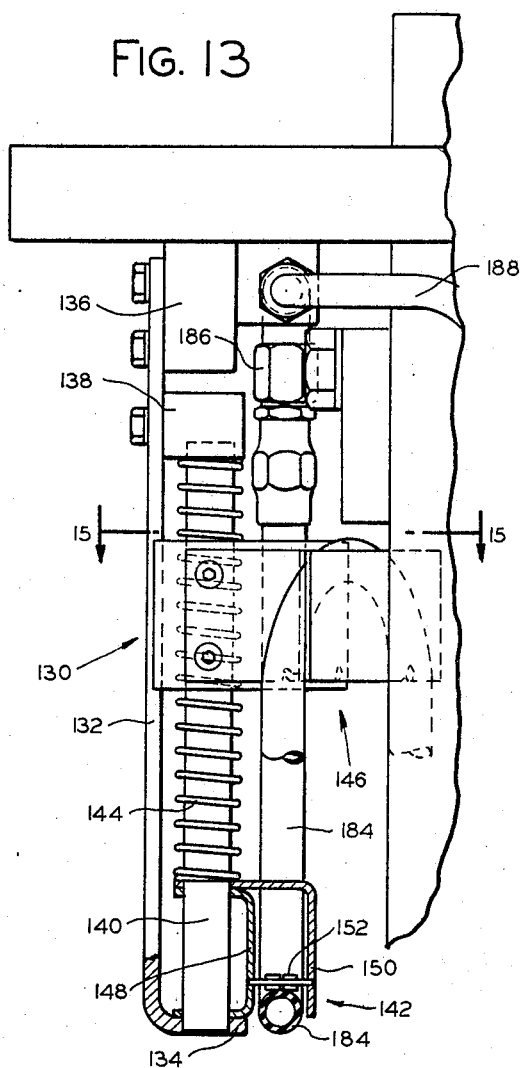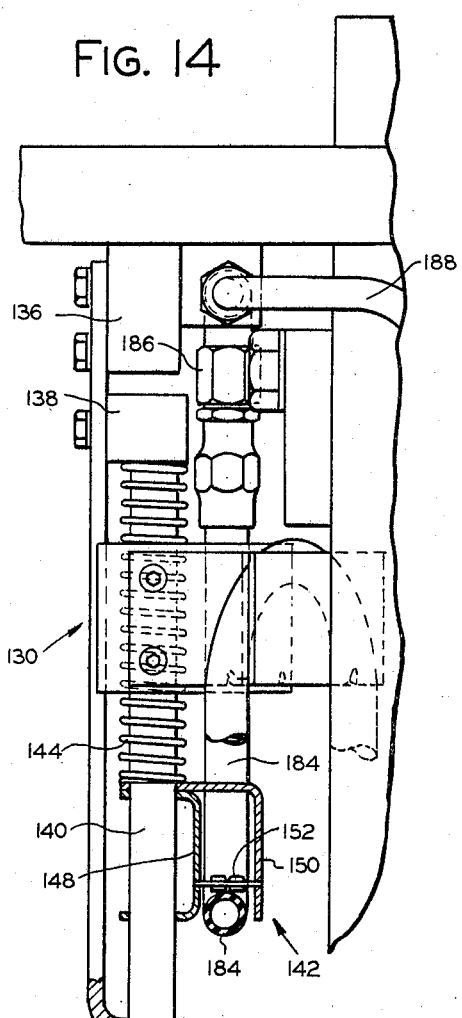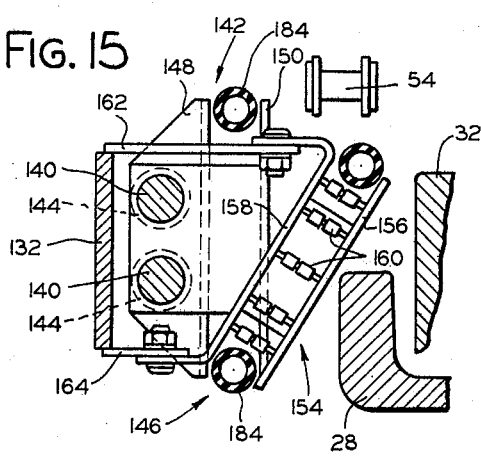

United States Patent Office 3,481,498
Patented Dec. 2, 1969

3,481,498
APPARATUS FOR REEVING CONDUITS IN A TRIPLE SECTION EXTENDIBLE MAST
Charles R. Sturtz, Jr., Detroit, Mich., assignor to Clark Equipment Company, a corporation of Delaware
Filed June 12, 1967, Ser. No. 645,366
Int. Cl. B66f 9/06
U.S. Cl. 214—620                              5 Claims

ABSTRACT OF THE DISCLOSURE

Apparatus for reeving fluid conduits to attachments mounted on the carriage of three-stage extendible uprights.

BACKGROUND OF THE INVENTION

The field of art to which the invention pertains includes elevators, and more specifically portable elevators.

When a fluid operated attachment is mounted on the carriage of a lift upright it is necessary to provide fluid conduits to supply pressurized fluid to the attachment. Because the attachment is movable vertically a substantial distance due to the vertical extension of the upright it is necessary to provide some means for paying out and taking up the fluid conduits as the attachment is moved vertically. Frequently, this is accomplished by a reel which is mounted on the mast of the upright. The use of take-up reels is undesirable because the reels usually are mounted in exposed locations, and so are very susceptible to damage. Further, a reel necessitates the use of a swivel joint for each fluid conduit and swivel joints are troublesome because they tend to leak.

Other means for paying out fluid conduits is disclosed by U.S. Patent No. 3,289,869, issued on Dec. 6, 1966, in the name of Deryl R. Hoyt and involves reeving the fluid conduit around several sheaves so that at least one loop is formed. The sheave engaging the bight portion of the loop is movable vertically and weighted so that there is a force applied to the loop tending to enlarge it. Such apparatus is not only heavy and bulky, but also usually must be mounted outwardly of the upright mast where it is subject to damage.

Consequently, a principal object of my invention is to provide apparatus for reeving fluid conduits in an upright which is compact, lightweight, utilizes static type fittings and is located generally behind and within the lateral limits of the upright.

SUMMARY OF THE INVENTION

In carrying out my invention in one embodiment thereof, I provide a three-stage upright having a mast, an intermediate slide, an inner slide, a carriage and an extendible fluid motor for elevating the slides and the carriage. The fluid motor is operatively connected to the carriage and slides so that extension of the fluid motor first causes the carriage to move to the top of the inner slide and further extension of the fluid motor then causes the inner slide and intermediate slide to move upwardly simultaneously, the inner slide moving at the same rate relative to the intermediate slide as the intermediate slide moves relative to the mast. A pair of sheaves are mounted for rotation on the intermediate slide adjacent the top thereof and a pair of flexible fluid conduits are fastened to the mast adjacent the top thereof, trained over separate ones of the sheaves and then fastened to the inner slide adjacent the bottom thereof.

Another embodiment of my invention is similar to the above-mentioned embodiment, except that a pair of conduit guides are connected to the intermediate slide adjacent the bottom thereof, a pair of elastic fluid conduits are connected to the mast and inner slide and trained under different ones of the guides, and means are provided to compensate for shortening of the fluid conduits when pressurized fluid is supplied to them.

The above and other objects, features and advantages of my invenion will be more readily undersood by persons skilled in the art when the following detailed description is taken in conjunction with the drawing.

BRIEF DESCRIPTION OF THE DRAWING

FIGURE 1 is a rear-quarter perspective view of a portion of a lift truck with the upright extended and showing to advantage the conduit reeving between the mast and the carriage, FIGURE 2 is an elevational view from the rear of a three-stage upright in the fully collapsed position showing to advantage my invention, FIGURE 3 is a cross-sectional view substantially along line 3—3 shown in FIG. 2, FIGURE 4 is a fragmentary plan view on an enlarged scale of the upright, FIGURE 5 is a view similar to FIG. 2, except that the carriage is raised to the top of the inner slide, FIGURE 6 is a view similar to FIGS. 2 and 5, except that the upright is fully extended, FIGURE 7 is a rear quarter perspective view of a portion of a lift truck with the upright extended and embodying a modification of my invention, FIGURE 8 is an elevational view from the rear of the three-stage upright shown in FIG. 7, FIGURE 10 is a view similar to FIGS. 7 and 9, except that the upright is fully extended, FIGURE 11 is a fragmentary plan view on an enlarged scale of the upright shown tn FIGS. 7 through 10, FIGURE 12 is a cross section taken along line 12—12 of FIG. 8 of a conduit guide and mount, FIGURE 13 is a detailed view of an enlarged scale of the apparatus to compensate for shortening of an elastic fluid conduit when pressurized fluid is supplied to it, FIGURE 14 is a view similar to FIG. 13 and shows the condition of the apparatus when pressurized fluid is supplied to the conduit, and FIGURE 15 is a cross section taken along line 15—15 of FIG. 13.

DESCRIPTION OF THE PREFERRED EMBODIMENTS

Figure 9:
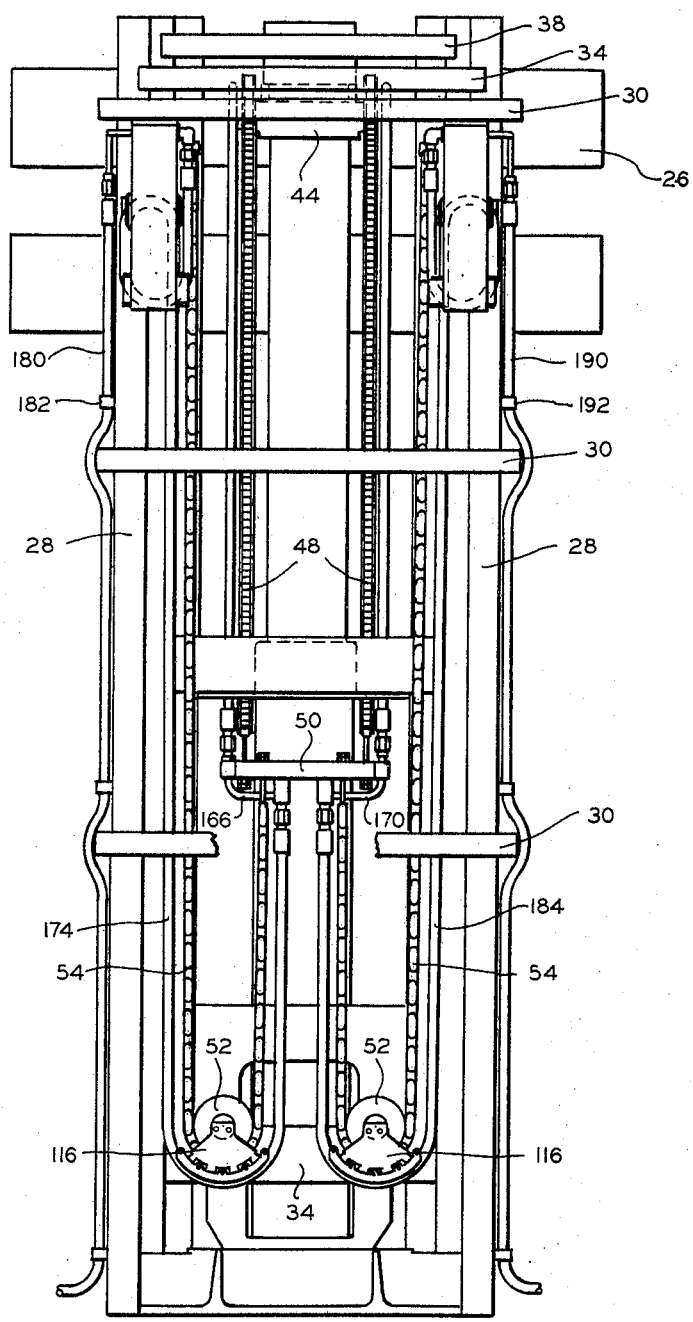
FIGURE 9 is a view similar to FIG. 8, except that the carriage is raised to the top of the inner slide.

Referring now to FIG. 1, the reference numeral 10 denotes generally a portion of a lift truck which includes a cowl 12 on which are mounted various control levers 14 and a steering control wheel 16. Mounted on lift truck 10 forwardly of cowl 12 is an upright 18 which is shown extended.

Referring now also to FIGS. 2 through 6, upright 18 includes a mast 20, an intermediate slide 22 telescoped in and movable vertically relative to mast 20, an inner slide 24 telescoped in and movable vertically relative to intermediate slide 22 and a carriage 26 movable vertically along inner slide 24.

Mast 20 includes a pair of spaced apart C-shaped channels 28 which are connected by a plurality of cross braces 30 to form a rigid unitary structure. Intermediate slide 22 includes a pair of spaced apart I-shaped channels or rails 32 which are connected by means of a plurality of cross braces 34 to form a rigid unitary structure, and similarly inner slide 24 includes a pair of spaced apart I-shaped channels or rails 36 connected by a plurality of cross braces 38 to form a rigid unitary structure.

Upright 18 also includes a multiple ram type extendible fluid motor 40 having an outer cylinder portion 42 fixed to inner slide 24. Fluid motor 40 is disposed intermediate the channels and rails, as shown, in a longitudinal extending position relative to the rails and channels.

Mounted on an extendible portion of fluid motor 40 is a cross arm 44 on which a pair of sprockets 46 are mounted for rotation on each side of the fluid motor 40. A pair of chains 48 are connected to carriage 26, trained over sprockets 46 and then connected to an anchor plate 50 mounted on cylinder 42 of fluid motor 40. Also, a pair of sprockets 52 are mounted for rotation on intermediate slide 22 adjacent the bottom thereof. A pair of chains 54 are connected to different ones of channels 28 of mast 20, reeved under sprockets 52 and then connected to anchor plate 50, as shown.

By supplying pressurized fluid to fluid motor 40, assuming that upright 18 is in the condition shown in FIG. 2, cross arm 44 will be actuated to move from the position shown in FIG. 2 to the position shown in FIG. 5 with the result that carriage 26 will be moved to the top of mast 20. It will be noted that when carriage 26 is in the position shown in FIG. 5 that slides 22 and 24 have not yet begun to extend out of mast 20, and so upright 18 is said to have a full free lift. That is, carriage 26 extends to the top of mast 20 before slides 22 and 24 begin to extend out of mast 20.

Supplying more pressurized fluid to motor 40 when upright 18 is in the position shown in FIG. 5 then causes fluid motor 40 to extend so that inner slide 24 is moved outwardly of intermediate slide 22. The result of this is that anchor plate 50 to which chains 54 are attached moves away from sprockets 52. Consequently, movement of inner slide 24 outwardly of intermediate slide 22 also causes intermediate slide 22 to extend upwardly out of mast 20. It will be appreciated that the movement of inner slide 24 and intermediate slide 22 is simultaneous and that the rate of movement of inner slide 24 relative to intermediate slide 22 is the same as the rate of movement of intermediate slide 22 relative to mast 20. For a more detailed description of an upright of this type reference should be had to U.S. Patent No. 3,298,463 issued in the name of R. F. McIntosh on Jan. 17, 1967.

While no load-engaging means has been shown mounted on carriage 26 it will be understood that in place of the usual fork arms that a great variety of attachments may be mounted on carriage 26. Some of these attachments utilize one or more fluid motors, and so require some means of conveying pressurized fluid from a source of pressurized fluid, such as a pump, mounted in the body of the lift truck to the attachment. Since it is immaterial to my invention what type of attachment is mounted on carriage 26 I have not shown any attachment mounted thereon, but it will be understood, for example, that a side shifter attachment or a carton clamp may be mounted thereon.

In order to convey pressurized fluid to any attachment requiring pressurized fluid mounted on carriage 26 I provide a junction block 56 connected to carriage 26. Junction block 56 includes a pair of ports 58 and 60 which are adapted to be connected to the fluid motor of the attachment mounted on carriage 26. Also, junction block 56 includes a port 62 which communicates with port 58 and another port 64 which communicates with port 60. A rigid fluid conduit 66 is connected at one end to port 62 and is connected at the other end to a junction block 68 mounted on carriage 26. Similarly, a rigid fluid conduit 70 is connected at one end thereof to port 64 and is connected at the other end thereof to a junction block 72 mounted on carriage 26.

One end of a flexible fluid conduit 74 is connected to junction block 68 and hence conduit 66, reeved over a sheave 76 mounted for rotation on cross arm 44 outwardly of the adjacent sprocket 46 and then connected at the other end thereof to one end of a rigid fluid conduit 78 which is connected to inner slide 24 by means of a bracket 80.

Another flexible fluid conduit 82 is connected at one end thereof to the end of conduit 78 remote from conduit 74, reeved over a sheave 84 mounted for rotation on intermediate slide 22 adjacent the top thereof, trained around an arcuate shaped guide 86 mounted on mast 20 and then run down along channel 28, to which it is connected by a series of clips 88, to a point adjacent the lower corner of mast 20 from which it is then run to the body of truck 10.

Another flexible fluid conduit 90 is connected at one end thereof to junction block 72 and hence conduit 70, reeved over a sheave 92 mounted for rotation on cross arm 44 outwardly of adjacent sprocket 46, trained downwardly alongside fluid motor 40 and connected at the other end thereof to one end of a rigid conduit 94 which is connected to inner slide 24 by bracket 80. A flexible fluid conduit 96 is connected at one end thereof to conduit 94 at the end remote from conduit 90, reeved over a sheave 98 mounted for rotation on intermediate slide 22, trained around an arcuate guide 100 mounted on mast 20, and then run down along the adjacent channel 28 of mast 20, to which it is fastened by a series of clips 102, to the lower right-hand corner of mast 20 from where it is then run over to the body of truck 10.

Both conduits 82 and 96 are connected to a control valve (not shown) mounted on the body of truck 10 which is operable to connect one of the conduits to a source of pressurized fluid while connecting the other conduit to the fluid reservoir or vice versa or connect neither of the conduits to the source of pressurized fluid and reservoir.

Sheave 84 is connected to a downwardly depending bracket 104 which is connected to the uppermost cross brace 34 of intermediate slide 22, and similarly sheave 98 is connected to a downwardly depending bracket 106 which is connected to the same cross brace as bracket 104. Also, guide 86 is connected to a downwardly depending bracket 108 which is connected to the uppermost cross brace 30 of mast 20 and guide 100 is connected to a bracket 110 which is connected to the same cross brace as bracket 108.

Referring to FIG. 2 especially, it will be seen that the vertical run of conduit 82 between conduit 78 and sheave 84 and the vertical run of conduit 96 between conduit 94 and sheave 98 are disposed behind fluid motor 40, and further that conduits 82 and 96 are then trained around guides 86 and 100, respectively, closely adjacent the top of mast 20 so that there is substantially no interference with driver visibility through upright 18 by conduits 82 and 96.

Referring to FIGS. 8 through 15, I will now describe another embodiment of my invention. The upright shown in these figures is the same as the upright shown in conjunction with the embodiment of my invention shown in FIGS. 1 through 6, and so reference here is made to the foregoing detailed description insofar as the upright is concerned, the same reference numerals which were applied to FIGS. 1 through 6 being applied to like parts in FIGS. 7 through 15. Further, the first portion of the conduit reeving of the second embodiment is substantially the same as that of the first embodiment, and so reference should be had to the detailed description of the first embodiment in this regard, like reference numerals being applied to like parts. The first portion of the conduit reeving of the second embodiment differs from the first embodiment in that flexible conduit 74 is connected to a fitting 112 mounted on anchor plate 50 and flexible conduit 90 is connected to a fitting 114 mounted on anchor plate 50. The remainder of the conduit reeving of the second embodiment differs from the first embodiment and will be described next.

Connected to the bottom cross brace 34 of intermediate slide 22 is a pair of conduit guides 116 located adjacent different ones of sprockets 52.

Referring specifically to FIG. 12, it will be seen that each conduit guide 116 includes a bracket 118 fastened by any suitable means, such as machine screws 122, to a stub shaft 120 on which the adjacent sprocket 52 is mounted for rotation. Bracket 118 includes a plurality of inwardly extending projections 124 to which a pair of arcuate plates 126 are connected by any suitable means, such as welding. Disposed between plates 126 and journaled for rotation therein is a plurality of rollers 128 which are disposed with their axes substantially parallel to each other and located on a portion of an arc which preferably has substantially the same center as the center about which the adjacent sprocket 52 rotates.

Connected to each channel 28 of mast 20 is mechanism 130 which accommodates shortening of certain of the conduits, as will be explained in more detail shortly. Referring now specifically to FIGS. 13, 14 and 15, each mechanism 130 includes a downwardly extending bracket 132 which has an inwardly extending portion 134. Each bracket 132 is mounted on a block 136 which is connected to the uppermost cross brace 30 of mast 18. Connected to bracket 132 between portion 134 and a block 138 fastened to bracket 132 is a pair of rods 140. A conduit guide 142 is mounted for sliding movement on rods 140 and normally is biased into abutment with portion 134 by means of a pair of helical springs 144 which are carried by rods 140 and disposed between block 138 and conduit guide 142. Mechanism 130 also includes another conduit guide 146 connected to bracket 132.

Conduit guide 142 includes a generally U-shaped member 148 and a generally L-shaped member 150 connected thereto by any suitable means, such as welding, and disposed as best shown in FIG. 13. Journaled between members 148 and 150 is a plurality of rollers 152 which are disposed with their axes substantially parallel along a portion of an arc. Conduit guide 146, which is best shown in FIG. 15, includes a generally U-shaped member 154 having a pair of legs 156 and 158 between which are disposed a plurality of rollers 160 which are journaled in legs 156 and 158 for rotation. Rollers 160 are disposed with their axes substantially parallel and located along a portion of an arc. Also, member 154 is connected to bracket 132 by means of a pair of support plates 162 and 164.

Connected to fitting 112, and hence with conduit 74, is a fluid conduit 166 which connects with another fitting 168 mounted on anchor plate 50. Similarly, a fluid conduit 170 is connected to fitting 114 and hence conduit 90. Conduit 170 also is connected to another fitting 172 which is mounted on anchor plate 50. Connected to fitting 168 is an elastic fluid conduit 174 which is trained around one of conduit guides 116, as shown, and then up and over one of conduit guides 146, under the adjacent conduit guide 142 and then connected to a fitting 176 which is mounted on the topmost cross brace 30. Connected to fitting 176, and hence conduit 174, is a rigid conduit 178 to which another flexible conduit 180 is connected. Conduit 180 is run down along the adjacent channel 28, to which it is attached by clips 182, to a point adjacent the bottom thereof from which it is then run over to a control valve mounted on truck 10. Likewise, an elastic conduit 184 is connected to fitting 172, trained around the other of conduit guides 116, as shown, and then run up and over the other of conduit guides 146, around under the other of conduit guides 142 and then connected to a fitting 186 mounted on the topmost cross brace 30. A rigid fluid conduit 188 is connected at one end to fitting 186 and at the other end to a flexible conduit 190 which runs down along the adjacent channel 28, to which it is attached by clips 192 to a point adjacent the bottom thereof from which it is then run over to a control valve, not shown, mounted on truck 10.

At this point it will be evident, especially from a comparison of FIGS. 8 and 10 that as slides 22 and 24 are extended upwardly out of mast 20 that conduits 174 and 184 are pulled around conduit guides 116 and up to the position shown in FIG. 10, the conduits at all times remaining taut and disposed substantially behind fluid motor 40 and mast 20 and slides 22 and 24 so that there is substantially no interference with operator visibility through upright 18.

Conduits 174 and 184 are elastic. Consequently, when pressurized fluid is supplied to either one of them the cross sectional dimension of the conduit to which pressurized fluid is supplied increases. As a result the particular conduit shortens. Depending upon the elasticity of the material of which the conduit is made the conduit may shorten as much as 4%. In order to compensate for the shortening of the conduit to which pressurized fluid is supplied, both conduits 174 and 184 are looped around respective ones of conduit guides 142 and 146 which are part of mechanisms 130, each conduit thereby forming a complete loop as can be seen best in FIG. 8. When pressurized fluid is being supplied to neither conduit 174 nor conduit 184 both mechanisms 130 are disposed substantially as shown in FIG. 13 with conduit guide 142 disposed in abutment with portion 134. Assuming now that pressurized fluid is supplied to conduit 184 so that it shortens, the result is that conduit guide 142 is moved upwardly against the bias of springs 144 to the position shown in FIG. 14. A similar action would take place for the other mechanism 130, should conduit 174 be supplied with pressurized fluid.

I claim:

1. The combination comprising a mast, an intermediate slide connected to and movable longitudinally of the said mast, an inner slide connected to and movable longitudinally of the said intermediate slide, means connected to the said mast and the said slides for moving the said slides simultaneously and moving the said inner slide at the same rate relative to the said intermediate slide as the said intermediate slide moves relative to the said mast, a conduit guide connected to the said intermediate slide, an elastic fluid conduit connected to and looped between the said mast and the inner slide and trained around the said conduit guide, and means for compensating for the change in length of the said fluid conduit when pressurized fluid is supplied to the said fluid conduit, the said compensating means including a second conduit guide, a third conduit guide movable toward and away from the said second conduit guide and a spring biasing the said third conduit guide away from the said second conduit guide, the said fluid conduit being looped around the said second and third conduit guides so that movement of the said third conduit guide away from the said second conduit guide causes a pull on the said fluid conduit.

2. The combination as set forth in claim 1 wherein the said conduit guide includes a plurality of rollers disposed with their axes of rotation substantially parallel along a portion of an arc.

3. An upright comprising a vertically extending elongated mast, an elongated intermediate slide connected to and movable longitudinally of the said mast, an elongated inner slide connected to and movable longitudinally of the said intermediate slide, a carriage connected to and movable longitudinally of the said inner slide, an extendible fluid motor having an upwardly extendible portion, a downwardly extendible portion connected to the said intermediate slide and an outer cylinder fixed to the said inner slide and out of which the said portions extend, first and second sprockets connected for rotation to the said intermediate slide adjacent the bottom thereof, third and fourth sprockets connected for rotation to the upwardly extendible portion, first and second chains connected to the said outer cylinder and the said mast adjacent the top thereof and trained under the said first and second sprockets, respectively, third and fourth chains connected to the said outer cylinder and the said carriage and trained over the said third and fourth sprockets, respectively, first and second conduit guides connected to the said intermediate slide adjacent the said first and second sprockets, respectively, third and fourth conduit guides connected to the said upwardly extendible portion, fifth and sixth conduit guides connected to the said mast adjacent the top thereof, seventh and eighth conduit guides connected to the said mast and movable toward and away from the said fifth and sixth conduit guides, respectively, first and second springs connected to the said seventh and eighth conduit guides, respectively, for biasing them away from the said fifth and sixth conduit guides, a first fluid conduit connected to the said mast, outer cylinder and carriage, the said first fluid conduit including a first elastic portion connected to the said mast and outer cylinder, looped around the said fifth and seventh conduit guides and trained under the said first conduit guide and a second elastic portion connected to the said carriage and outer cylinder and trained over the said third conduit guide, and a second fluid conduit connected to the said mast, outer cylinder and carriage, the said second fluid conduit including a third elastic portion connected to the said mast and outer cylinder, looped around the said sixth and eighth conduit guides and trained under the said second conduit guide and a fourth elastic portion connected to the said carriage and outer cylinder and trained over the said fourth conduit guide.

4. The upright as set forth in claim 3 wherein the said first and third elastic portions of the said fluid conduits are disposed in substantially the same plane as the said first and second chains.

5. The upright as set forth in claim 4 wherein the said first and third elastic portions of the said fluid conduits are disposed substantially entirely behind the said mast and slides so that there is virtually no interference with visibility through the upright by the said first and third elastic portions of the said fluid conduits.

References Cited
UNITED STATES PATENTS

| | | | |
|---|---|---|---|
| 2,345,338 | 3/1944 | Goldberg | 242—47.5 |
| 2,845,189 | 7/1958 | Sanders | 214—16.1 |
| 2,951,599 | 9/1960 | Bogar | 214—16.1 |
| 3,298,463 | 1/1967 | McIntosh | 187—9 |
| 3,339,768 | 9/1967 | Dixon | 214—730 |

GERALD M. FORLENZA, Primary Examiner

R. B. JOHNSON, Assistant Examiner